US010140748B2

(12) United States Patent
Napier et al.

(10) Patent No.: US 10,140,748 B2
(45) Date of Patent: Nov. 27, 2018

(54) COUNT-DOWN TIMER DISPLAY

(71) Applicant: Honda Motor Co., Ltd., Tokyo (JP)

(72) Inventors: Parhys Napier, Hilliard, OH (US); Hajime Yamada, Saitama (JP); Jessica Champi, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 17 days.

(21) Appl. No.: 15/398,441

(22) Filed: Jan. 4, 2017

(65) Prior Publication Data
US 2018/0190001 A1    Jul. 5, 2018

(51) Int. Cl.
*G06T 13/80* (2011.01)
*G06T 11/60* (2006.01)
*G01C 21/26* (2006.01)

(52) U.S. Cl.
CPC .............. *G06T 13/80* (2013.01); *G01C 21/26* (2013.01); *G06T 11/60* (2013.01)

(58) Field of Classification Search
CPC ......... G06T 13/40; G06T 13/00; G06T 13/80; G06T 13/20; A63F 13/10
See application file for complete search history.

(56) References Cited

U.S. PATENT DOCUMENTS

| | | | |
|---|---|---|---|
| 6,628,571 B2 * | 9/2003 | Emami | G04B 19/00 368/223 |
| 7,885,146 B2 | 2/2011 | Parkinson et al. | |
| 8,099,201 B1 * | 1/2012 | Barber | G01C 23/00 340/945 |
| 2004/0059501 A1 * | 3/2004 | Ikeda | G08G 1/096716 701/431 |
| 2005/0052953 A1 * | 3/2005 | Kent | G04G 9/00 368/82 |
| 2005/0149254 A1 * | 7/2005 | Yamada | G01C 21/343 701/425 |
| 2008/0013407 A1 | 1/2008 | Rauchle | |
| 2009/0137347 A1 * | 5/2009 | Jenkins | A63B 69/0071 473/433 |
| 2010/0141763 A1 * | 6/2010 | Itoh | G06K 9/00771 348/143 |
| 2010/0182324 A1 * | 7/2010 | Ko | G06T 13/80 345/473 |
| 2010/0316982 A1 | 12/2010 | Singh | |

(Continued)

FOREIGN PATENT DOCUMENTS

DE    202004001149 U1    4/2004

*Primary Examiner* — Abderrahim Merouan
(74) *Attorney, Agent, or Firm* — Honda Patents & Technologies North America, LLC; Adam G. Pugh

(57) ABSTRACT

A method for displaying a count-down timer may include, in one or more aspects, receiving data representing an initial estimated arrival time for a vehicle; dividing the initial estimated arrival time into preset time intervals; displaying within the vehicle an animation including a plurality of objects each representing one of the time interval. The animation may further include representing the passage of time by the sequential movement of the plurality of objects such that movement of the last object in the sequence is determined to coincide with the initial estimated arrival time, and selectively responding to only some updated estimates to arrival time by modifying the animation such that the movement of the last object in the sequence is determined to coincide with the update.

20 Claims, 8 Drawing Sheets

(56) References Cited

U.S. PATENT DOCUMENTS

| | | |
|---|---|---|
| 2012/0150436 A1 | 6/2012 | Rossano et al. |
| 2014/0361126 A1* | 12/2014 | Steffen .................... B61L 29/22 |
| | | 246/473.1 |
| 2014/0361985 A1* | 12/2014 | Arai ........................ G06F 3/017 |
| | | 345/156 |
| 2016/0227095 A1* | 8/2016 | Yoshizawa ............. G03B 17/38 |
| 2016/0378067 A1* | 12/2016 | Bishop ..................... G04F 3/06 |
| | | 368/241 |

* cited by examiner

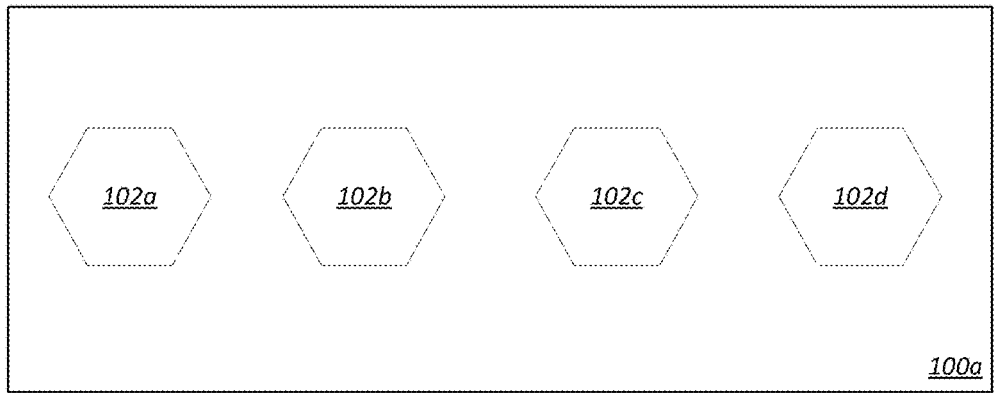
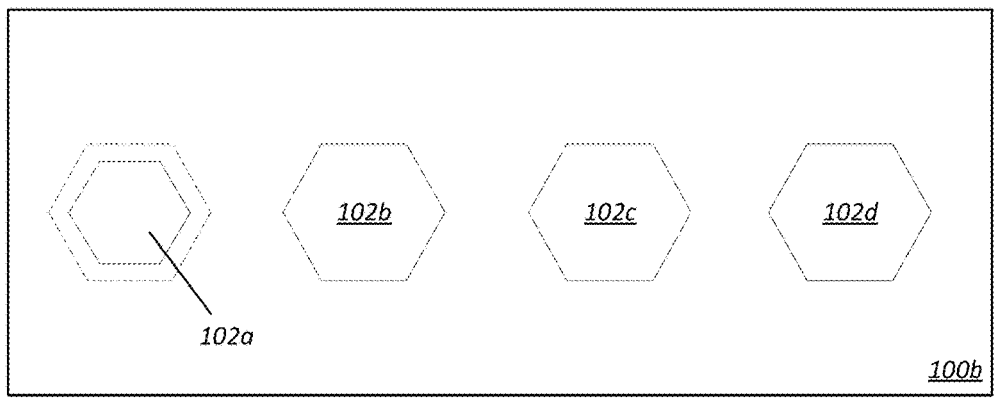
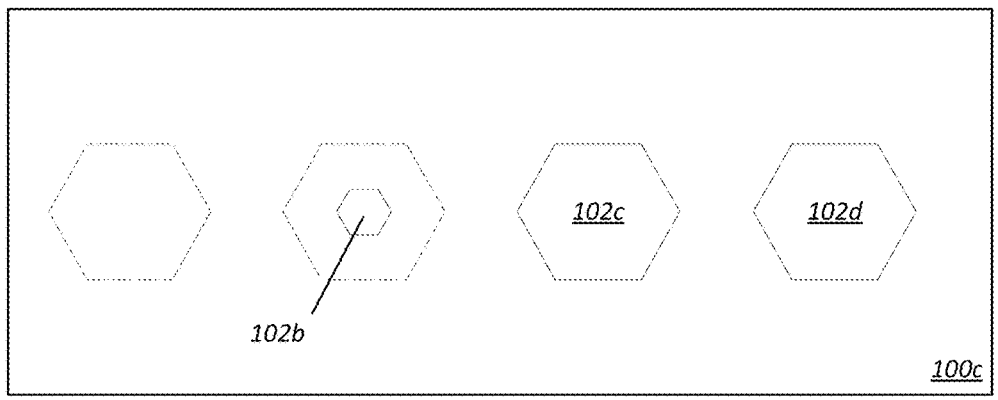
Fig. 1

COUNT-DOWN TIMER DISPLAY

BACKGROUND

Generally, vehicles may be equipped with displays, such as center console displays, touch screen displays, or other displays. These displays may be utilized to render information for a driver, passenger, or other occupant of a vehicle. For example, a display may render the day, the time, navigation instructions, etc. As another example, a display may render information for menu navigation. Vehicles may include displays specifically designed to provide supplemental information to passengers.

BRIEF DESCRIPTION

According to one or more aspects, a computer-implemented method can include receiving data representing an initial estimated arrival time for a vehicle; dividing the initial estimated arrival time into preset time intervals; and displaying within the vehicle an animation including a plurality of objects, each of the objects representing one of the preset time intervals. The animation can further include representing the passage of time by the sequential movement of the plurality of objects such that movement of the last object in the sequence is determined to coincide with the initial estimated arrival time; in response to receiving a first estimated arrival time revision representing a first updated estimated arrival time, modifying the animation such that the movement of the last object in the sequence is determined to coincide with the first updated estimated arrival time; and determining not to modify the animation in response to receiving a second estimated arrival time revision representing a second updated estimated arrival time.

In one or more embodiments, modifying the animation in response to the first estimated arrival time revision can be based on comparing the first revision to a predetermined threshold. Determining not to modify the animation in response to receiving the second estimated arrival time revision can be based on comparing the second revision to the threshold.

In one or more embodiments, the predetermined threshold is can be a change threshold. Comparing each revision to the threshold can include determining whether a time difference between the updated estimated arrival time and a previously received estimated arrival time exceeds the change threshold.

In one or more embodiments, the predetermined threshold can be a remaining time threshold, comparing each revision to the threshold can include determining whether the updated estimated arrival time exceeds the remaining time threshold.

In one or more embodiments, the estimated arrival times can be received from a navigation system associated with the vehicle.

In one or more embodiments, modifying the animation can include changing a total number of the plurality of objects included in the animation.

According to one or more aspects, a computer-implemented method can include receiving data representing an initial estimated arrival time for a vehicle; dividing the initial estimated arrival time into preset time intervals; and displaying within the vehicle an animation including a plurality of objects, each of the objects representing one of the preset time intervals. The animation can further include representing the passage of time by the sequential movement of the plurality of objects such that movement of the last object in the sequence is determined to coincide with the initial estimated arrival time; in response to receiving an estimated arrival time revision representing an updated estimated arrival time, comparing the revision to a predetermined threshold; and modifying the animation such that the movement of the last object in the sequence is determined to coincide with the updated estimated arrival time based on a result of comparing the revision to the threshold.

In one or more embodiments, the method can further include, in response to receiving a second estimated arrival time revision representing a second updated estimated arrival time, comparing the second revision to the threshold; and determining not to modify the animation based on a result of comparing the second revision to the threshold.

In one or more embodiments, the predetermined threshold can be a change threshold. Comparing the revision to the threshold can include determining that the time difference between the updated estimated arrival time and a previously received estimated arrival time exceeds the change threshold.

In one or more embodiments, the predetermined threshold can be a remaining time threshold. Comparing the revision to the threshold can include determining that the updated estimated arrival time exceeds the remaining time threshold.

According to one or more aspects, a computer-implemented method can include receiving data representing an initial estimated arrival time for a vehicle and displaying an animation within the vehicle. Displaying the animation can include representing the passage of time by the animation such that the conclusion of the animation is determined to coincide with the initial estimated arrival time; in response to receiving an estimated arrival time revision representing an updated estimated arrival time, comparing the revision to a predetermined threshold; and modifying the animation such that the conclusion of the animation is determined to coincide with the updated estimated arrival time based on a result of comparing the revision to the threshold.

In one or more embodiments, the method can further include, in response to receiving a second estimated arrival time revision representing a second updated estimated arrival time, comparing the second revision to the threshold; and determining not to modify the animation based on a result of comparing the second revision to the threshold.

In one or more embodiments, the predetermined threshold can be a change threshold. Comparing the revision to the threshold can include determining that the time difference between the updated estimated arrival time and a previously received estimated arrival time exceeds the change threshold.

In one or more embodiments, the predetermined threshold can be a remaining time threshold. Comparing the revision to the threshold can include determining that the updated estimated arrival time exceeds the remaining time threshold.

In one or more embodiments, the animation can include a plurality of objects, each of the objects representing a distinct interval of time comprising the initial estimated arrival time. The animation can further include representing the passage of time by the sequential movement of the plurality of objects such that movement of the last object in the sequence is determined to coincide with the initial estimated arrival time. The animation can be modified such that the movement of the last object in the sequence is determined to coincide with the updated estimated arrival time.

In one or more embodiments, modifying the animation can include changing a total number of the plurality of objects included in the animation.

In one or more embodiments, the estimated arrival times can be received from a navigation system associated with the vehicle.

In one or more embodiments, a vehicle entertainment system can include a user display and a computer-readable medium having instructions to carry out one or more of the aforementioned embodiments to display the animation on the user display.

BRIEF DESCRIPTION OF THE DRAWINGS

FIG. 1 is an illustration of an example count-down timer display, according to one or more embodiments.

FIG. 5 is an illustration of selected frames for an animated receiving mechanism for a count-down timer display, according to one or more embodiments.

DETAILED DESCRIPTION

Figure 2:
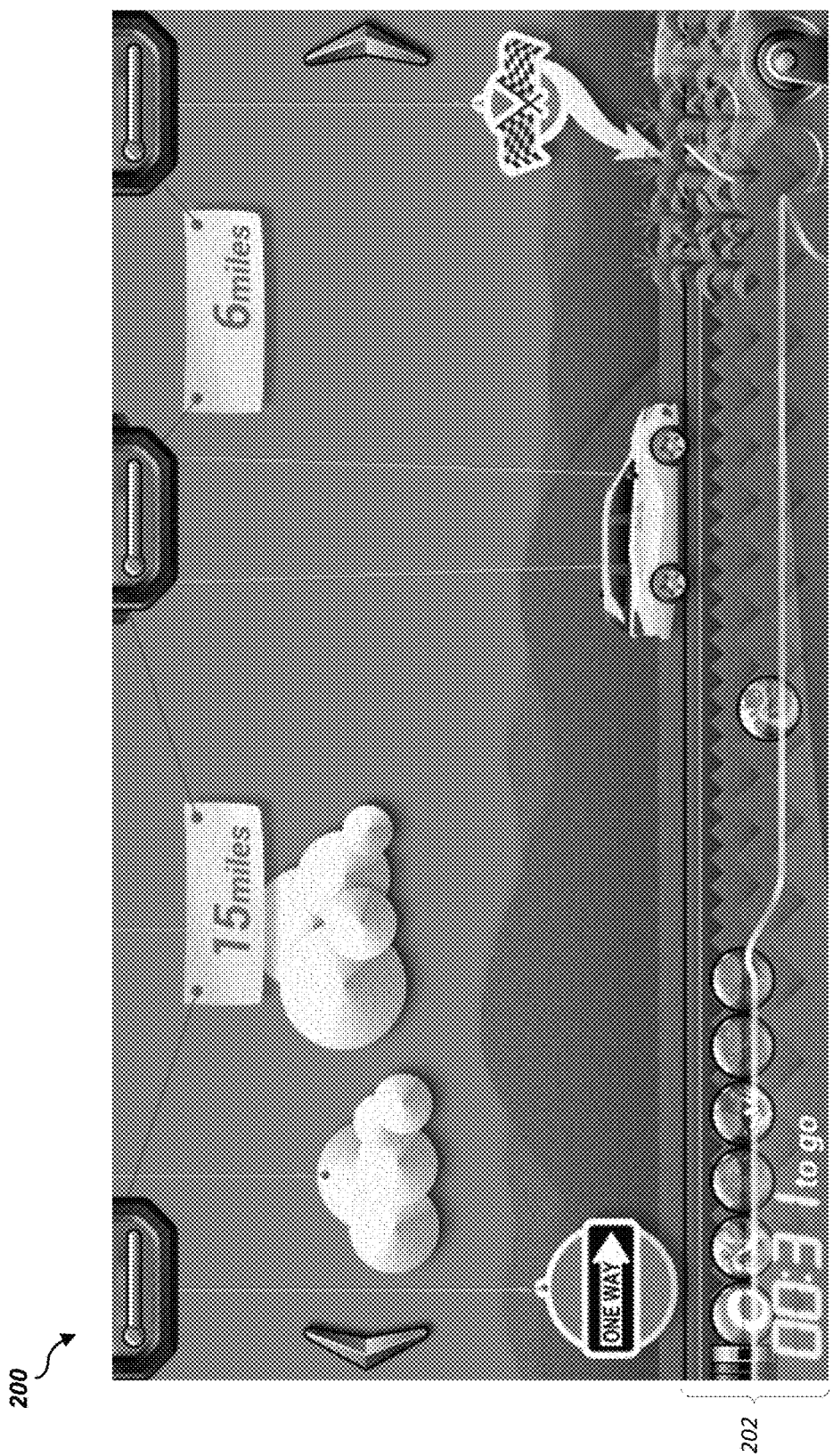
FIG. 2 is an illustration of an example display for providing vehicle travel information to a user, according to one or more embodiments.

Techniques and systems are described that provide information to passengers of a vehicle regarding the vehicle's travel. In some implementations, the system may display a visual representation of the estimated duration of a trip that can be understood by young children. A passenger vehicle may include a rear entertainment system that can display the visual representation to some or all of the rear passengers, which may be included in a larger composite animation providing information regarding the vehicle route. Elements of the visual representation, referred to as a "count-down timer" herein, as described below in a variety of non-limiting examples.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

The following terms are used throughout the disclosure, the definitions of which are provided herein to assist in understanding one or more aspects of the disclosure.

As used herein, the term "user" may include a driver of a vehicle, an operator of a vehicle, a passenger of a vehicle, an occupant of a vehicle, an individual, an entity, etc.

As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such an inference may result in the construction of new events or new actions from a set of observed events or stored event data, whether or not the events are correlated in close temporal proximity, and whether the events and data come from one or several event and data sources.

FIG. 1 is an illustration of a time counter including some of the elements of the present disclosure. The time counter is shown in a plurality of frames 100a-c that illustrate the animation changing over time. The time counter includes objects 102a-d, each of which visually represents an interval of time associated with the estimated arrival time of a vehicle. The objects are not necessarily limited to basic shapes nor must they be uniform; in some embodiments, each of the objects can be a visibly distinct image, including an animated shape or character.

Frame 100a shows the four objects 102a-d at the beginning of the count-down, the four objects reflecting four time intervals. The four objects 102a-d, in sequence, shrink and disappear to represent the passing of time. Frame 100b shows a time when significantly less than one fourth of the estimated duration has elapsed, with the first object 102a only beginning to shrink. The user could infer, from frame 100c, that almost half the estimated duration has elapsed because the second object 102b of the four is almost gone. Although not shown, in some implementations the objects can move around, rotate, change color, and display other animated features to attract and maintain the user's attention.

FIG. 2 is an illustration of an example display 200 for user information, according to one or more embodiments. The display 200 is a composite image that includes various objects that provide information to a user regarding the progress of a vehicle along a known route towards a destination. It will be understood that the display 200 is only one of many possible examples that illustrate potential embodiments of the disclosure and that many of the described components could be altered or omitted without departing from the understanding of the disclosure by one skilled in the art.

Part of the display 200 is a time counter 202, which may be superimposed over static or moving background imagery as shown.

Figure 3:
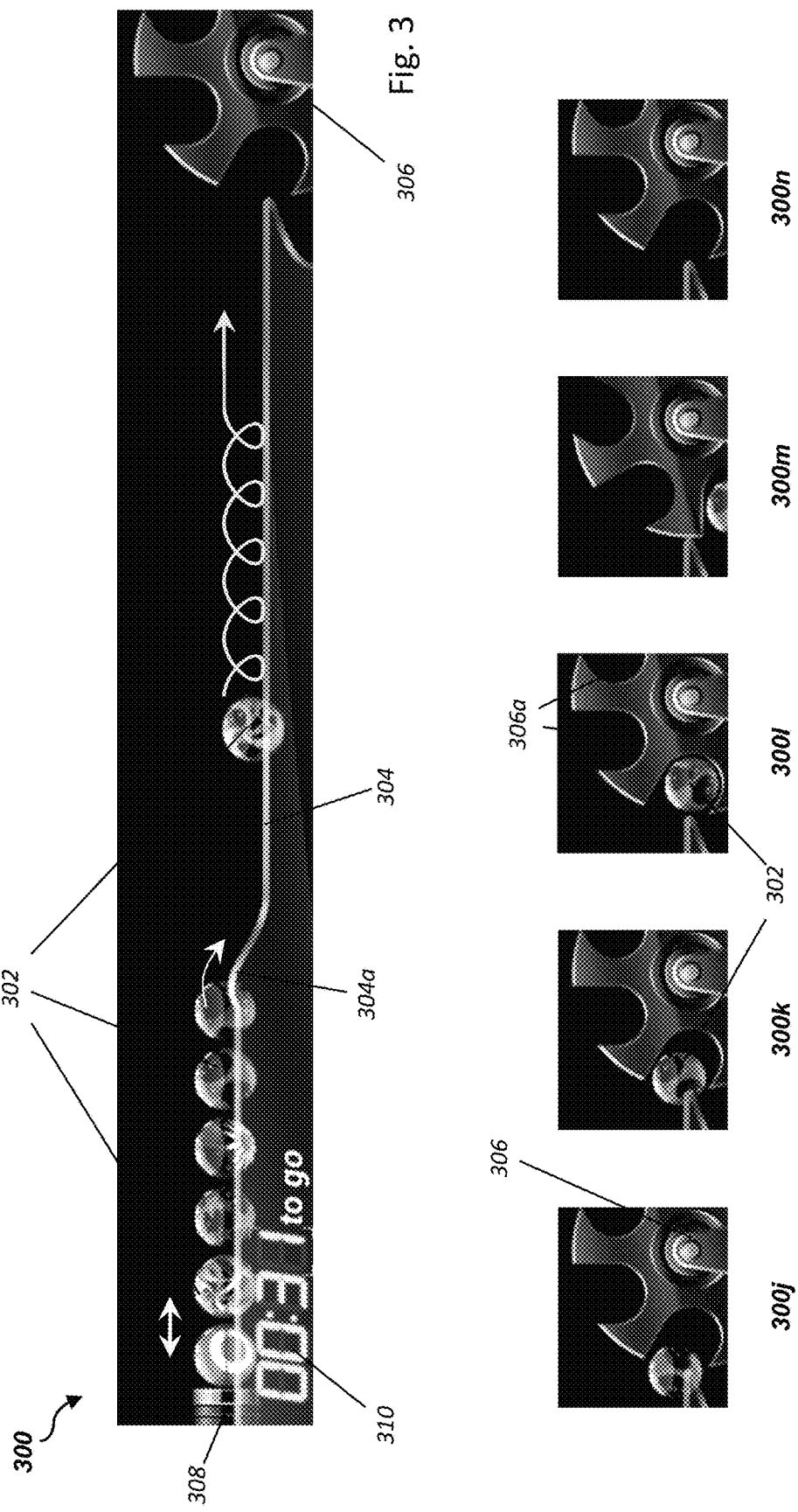
FIG. 3 is an illustration of an example count-down timer display, according to one or more embodiments.

An example time counter 300 is illustrated in FIG. 3. Here, a digital clock display 310 indicates 31 minutes left before arrival time. The counter 300 itself includes a plurality of balls 302 that roll along a track 304. As shown, each of the balls 302 may include a different display image.

As shown, the balls 302 roll along the track 304 individually, starting with the rightmost ball. Each ball 302 passes over the hump 304a, roll along the track 304, and enter the mechanism 306, where the ball is moved out of the field of view by the mechanism 306 before the next ball 302 is pushed over the hump 304a. In one exemplary implementation, the entire animation from when a ball 302 passes over the hump 304a to the resetting of the mechanism 306 may take one minute, with the next ball being released four minutes later. So, in the illustrated example of the counter 300, the currently rolling ball moves during the interval of 31 minutes remaining to 30 minutes until arrival, and the remaining six balls still to the left of the hump in the illustration of FIG. 3 collectively represent the 30 minutes still remaining before the estimated arrival time—the next ball being released at the 26 minute mark, then at the 21 minute, 16 minute, 11 minute, 6 minute, and 1 minute marks.

The pusher 308 to the left of the last ball 302 lets the user infer that the visible balls are the final balls in the sequence, and that the completion of the journey of the last ball 302 will coincide with the expected arrival time.

Figure 4:
FIG. 4 is an illustration of selected frames of animation for a count-down timer display, according to one or more embodiments.

FIG. 4 illustrates a series of screen shots 300a-i showing the progression of the counter 300 over time. As shown in the first two shots 300a and 300b, the line of balls 302 continues off the edge of the field of view—the user can therefore infer that the remaining duration is at least equal to that represented by the visible balls. The pusher 308 becomes visible in the third screenshot 300c, at which point the user can again infer that the remaining time is represented by the six queued balls and one moving ball. The balls, 302, each of which includes a different image, are successively pushed across the track 304 and into the mechanism 306 to mark time to the estimated arrival time.

In some implementations, the system may receive data representing a revised estimated time. For example, where the data represents a navigation route, the route and corresponding distance and time data may be recalculated based on vehicle motion, user input, or external data such as traffic. Some navigation systems update periodically based on the vehicle's position and speed as measured by location data.

The count-down display may accommodate changing arrival time data in a variety of ways. In some implementations, the system may include a time threshold that is used to determine whether to modify the count-down display after receiving a revised time estimate. For example, if the number of objects left to count down exceed those shown on the screen, the number of objects can be modified to reflect the changing time. If all remaining objects are already visible but the remaining time still exceeds a threshold, the timing details of the remaining objects' animations may be modified to reflect the change. One or more balls may be visibly added or removed in some embodiments.

As an example, a count-down timer may typically release one ball every five minutes, as illustrated in FIGS. 3 and 4. Should an increased time estimate be received, indicating that the arrival time is now four minutes longer than previously thought, the next ball release time may be delayed by four minutes to reflect the difference. Similarly, the reduced arrival time may result in speedier ball releases to reflect the difference.

The nature of many navigation systems causes significant fluctuations in arrival times near the end of a route, when the estimated amount of time remaining is relatively small. In some implementations, the system may not respond to these changes as described above when the remaining time fails to exceed a predetermined threshold time (which may be, for example, five or ten minutes). Further, the particular animation of a ball rolling across the track may always take the expected amount of time, such as one minute, and may not vary in response to varying arrival times.

FIG. 5 illustrates frames 300j-n of a progressive animation for receiving a ball and moving it off-screen. As shown, the ball 302 is animated to be received by a mechanism 306 that includes a plurality of openings 306a. The mechanism 306 then rotates to take the ball 302 off-screen; at the conclusion of its animation sequence, the mechanism 306 appears identical to how it looked at the beginning of the sequence due to the radial symmetry of the design.

Other designs may be used for removing each ball from the display, and in one or more embodiments there may be no explicit mechanism or the mechanism may change in some way according to the number of objects it has received rather than resetting in appearance each time. In another embodiment, balls or other counter objects may leave the screen after a set interval without having been explicitly received or removed by any further mechanism.

Figure 6:
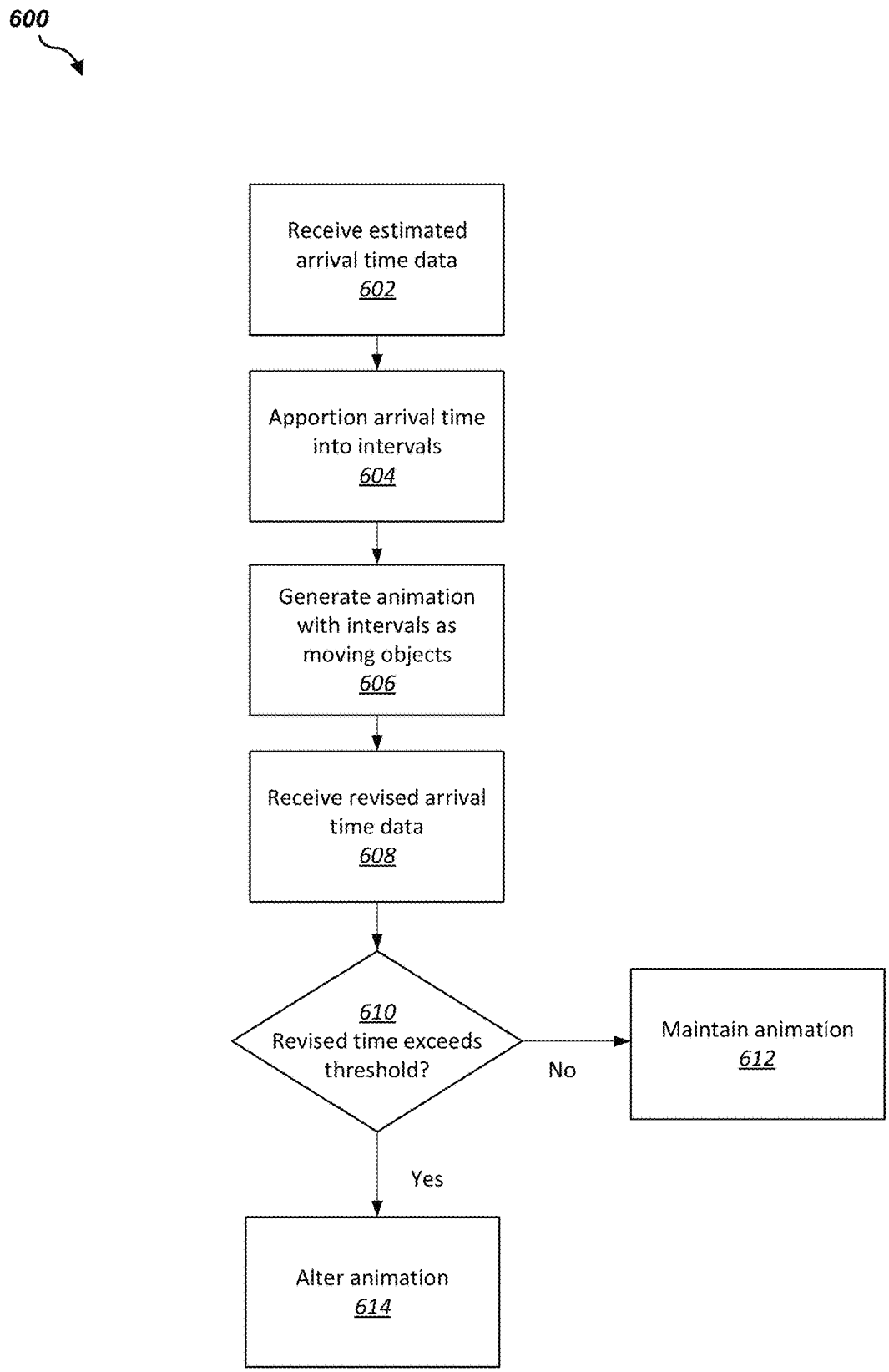
FIG. 6 is a flow diagram of a method for displaying a count-down timer, according to one or more embodiments.

FIG. 6 is a flowchart describing a process 600 for generating a count-down display in accordance with some implementations of the present disclosure. The flowcharts shown and described herein are for illustrative purposes only; one of ordinary skill will recognize variations of the process 600, both in order of execution and the inclusion of particular steps, evident in implementing the present disclosure.

A display system receives estimated time data for the vehicle (602). The time data may represent, for example, data for a route selected in the vehicle's navigation system. In some implementations, a user may also be able to query arrival time for particular destinations even when a route is not programmed, such as the estimated time to home or school.

The display system apportions the arrival time into segments (604). The segments are predetermined time intervals and, in some implementations, may be adjusted by a user or set by the system based on the total expected length of the trip. The system may use a shorter interval for shorter trips, such as those with an expected time of under 20 minutes, and a longer interval for longer trips.

Using the above examples of an animation in which a one-minute animation is used to mark the final minute of a five-minute interval, the following equation may be used:

$$n=\mathrm{floor}((t+4)/5)$$

where n is the number of segments based on an estimated arrival time of t minutes (the "floor" function rounds down to take the integer part of the quotient, ignoring the remainder). Adding four to the estimated time means that if there is a remainder of at least one minute from the multiple of five, an interval will be generated for that segment. More generally, $$n=\mathrm{floor}((t-a)/v)+1$$

where a is the time needed for the animation closing out each interval and v is the total interval time. In this way, an object will be generated for a partial interval only if there is enough time estimated to complete the animation for that interval.

The system generates and displays an animation, using an object to represent each interval (606). In the examples above, each object is a ball that is launched along a track. As described, the ball may be held on the track to represent the five-minute interval and launched when one minute is left in its interval, completing its rolling animation as the timer reaches the beginning of the next five-minute interval.

Subsequently, the system receives revised estimated arrival time data (608). The revised data may be due to a user selection, such as adjusting the parameters of the route, or data, such as the position of the vehicle or road conditions. The revised arrival time may be earlier or later than the estimated arrival time prior to the revision.

Upon receiving revised data, the system compares the revised arrival time against a threshold (610). The threshold may be predetermined for the system and may be, in some implementations, adjustable by a user. The threshold may reflect a minimum time in which the system can still seamlessly incorporate alterations to the animation sequence.

Figure 7:
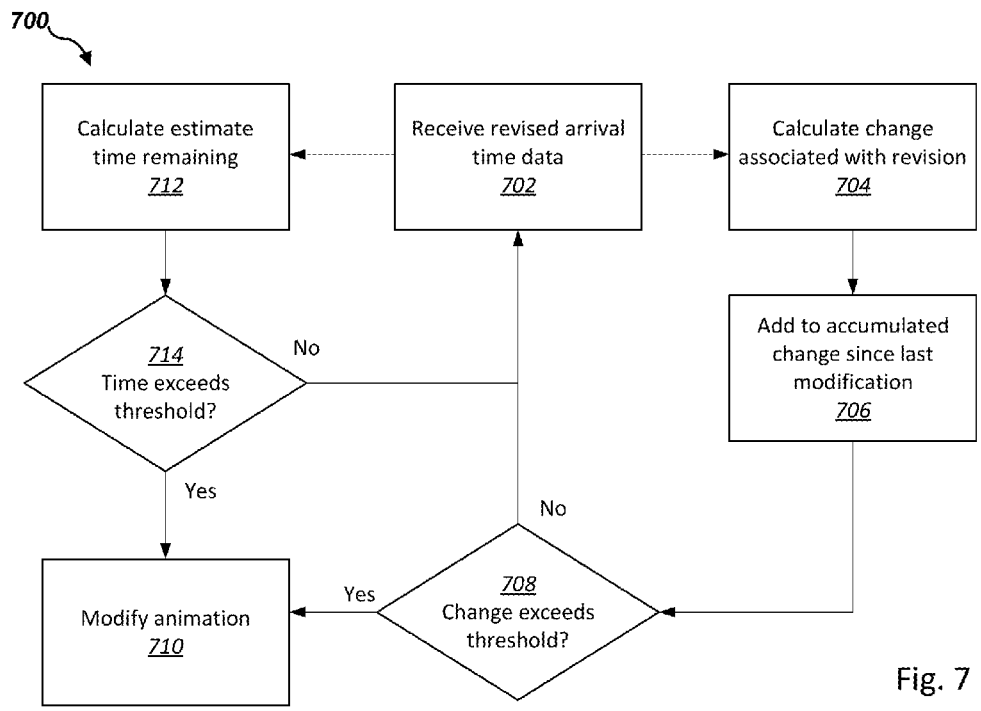
FIG. 7 is a flow diagram of a method for comparing an estimated time revision to a predetermined threshold, according to one or more embodiments.

FIG. 7 is a flowchart describing an exemplary process 700 for comparing the revised data to one or more thresholds. After receiving such an estimated time revision (step 702), the system may compare it against a change threshold (step 704) and/or a remaining time threshold (step 712).

Some implementations of the disclosure may include a change threshold—that is, the threshold may reflect the magnitude of the difference associated with the revised arrival time (for example, only alter the animation when the estimated time changes by at least five minutes). Where a change threshold is used, the system may calculate the time change associated with the revision (704), and may also track and total cumulative changes from multiple revisions (706). For example, when the estimated time is revised to three minutes later and then is further revised to three minutes later than that, the second revision results in a cumulative revision of six minutes, which would exceed the five-minute threshold. Whenever the cumulative change, if any, exceeds the established threshold (708), the animation is modified (710).

Some implementations of the disclosure may include a time remaining threshold—that is, the threshold may reflect whether there is at least a certain amount of time or more estimated until the destination is reached (714) (for example, only the alter the animation while the estimate time to arrival is greater than ten minutes). A time remaining threshold limits the system from rapidly and confusingly altering the count-down display based on the more ephemeral variations that often plague estimated times when near the route destination. If the time remaining exceeds the established threshold (714), the animation is modified (710).

In some implementations, both a change and a time remaining threshold may be used, and the two can potentially be used synergistically as well. One or more time remaining thresholds may represent delineations to the magnitude of the change threshold (for example, only alter the animation for changes of 10 minutes or more when the estimated time is above an hour, only for changes of 5 minutes or more when the estimated time is between 10 minutes and an hour, and not at all when the estimated time is under 5 minutes). Other variations of these principles will be recognized by one of skill in the art.

Figure 8:
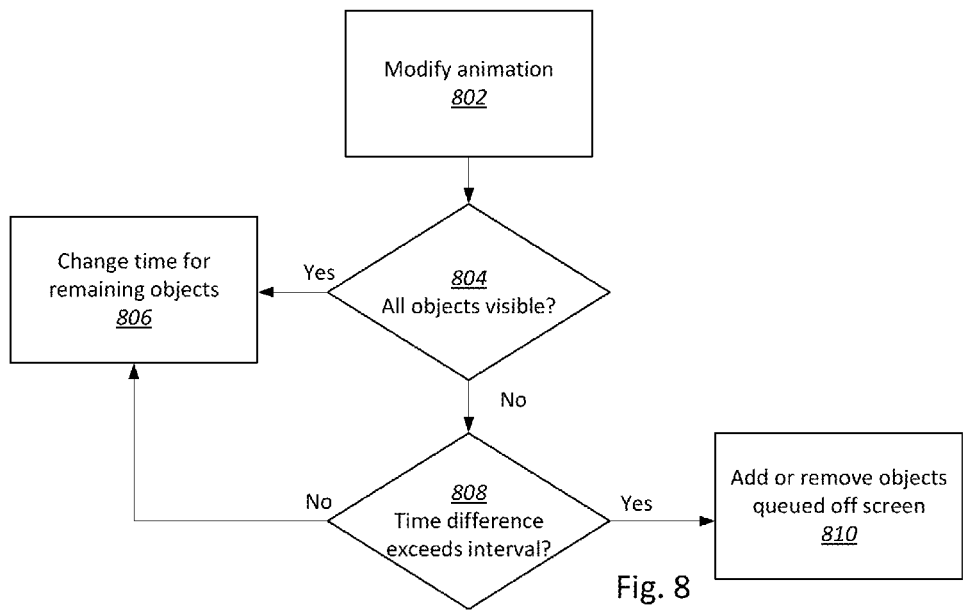
FIG. 8 is a flow diagram of a method for modifying a count-down timer animation, according to one or more embodiments.

FIG. 8 is a flowchart illustrating an exemplary process 800 for modifying the animation once the system determines to do so (802). If all of the objects are visible on the countdown display (804), then in some implementations the time allocated to these objects may be altered. The time to begin an animation may be adjusted for one or more of the objects, or the animation time itself may be adjusted to accommodate the revision. If one or more objects of the countdown timer are instead not yet visible (804), and if the time difference is significant enough that the total number of objects no longer matches the number of intervals (808), then the animation may be altered such that more or fewer objects are added to the display later than was originally planned (810). Using the earlier example of balls along a track where no more than seven balls are visible and each ball represents five minutes, consider a count-down timer with two hours remaining. Although seven balls are still visible, the system will also have queued another 17 balls to equal to two-hour count-down, with most of them still being off-screen and not yet presented to the user. If the estimated time is then adjusted to only be, for example, one hour and forty minutes, then the system can remove four balls from the queue without having to change the animation in any immediately visible way. The process 800 and other processes according to the disclosure that will be recognized in the art can create a seamless correspondence between the estimated arrival time and the count-down timer without disturbing the user with breaks or jumps in the animation.

Figure 9:
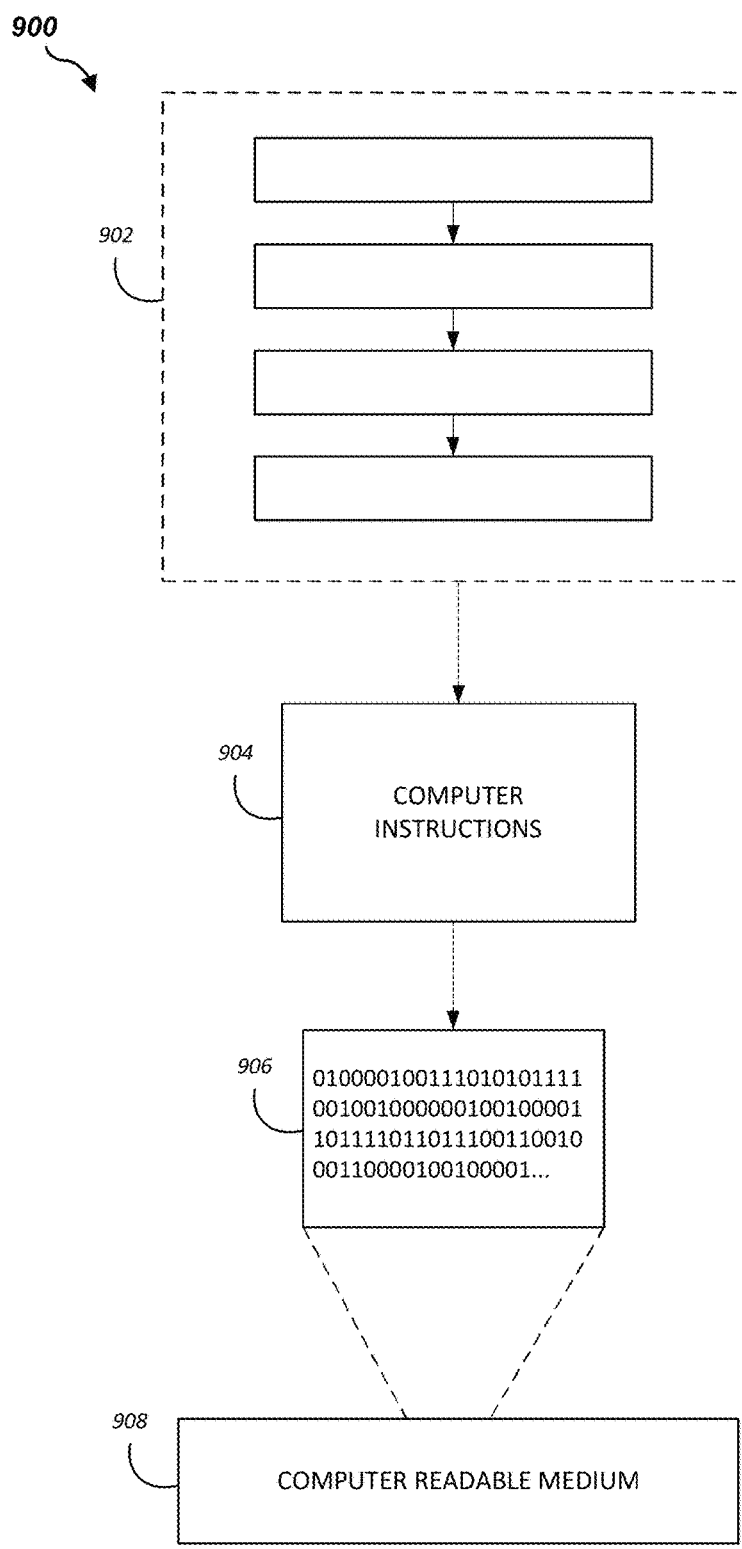
FIG. 9 is a schematic of an example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 9, wherein an implementation 900 includes a computer-readable medium 908, such as a CD-R, DVD-R, flash drive, a platter of a hard disk drive, etc., on which is encoded computer-readable data 906. This computer-readable data 906, such as binary data including a plurality of zero's and one's as shown in 906, in turn includes a set of computer instructions 904 configured to operate according to one or more of the principles set forth herein. In one such embodiment 900, the processor-executable computer instructions 904 may be configured to perform a method, such as the method 500 of FIG. 5. In another embodiment, the processor-executable instructions 904 may be configured to generate a display, such as the display 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 10:
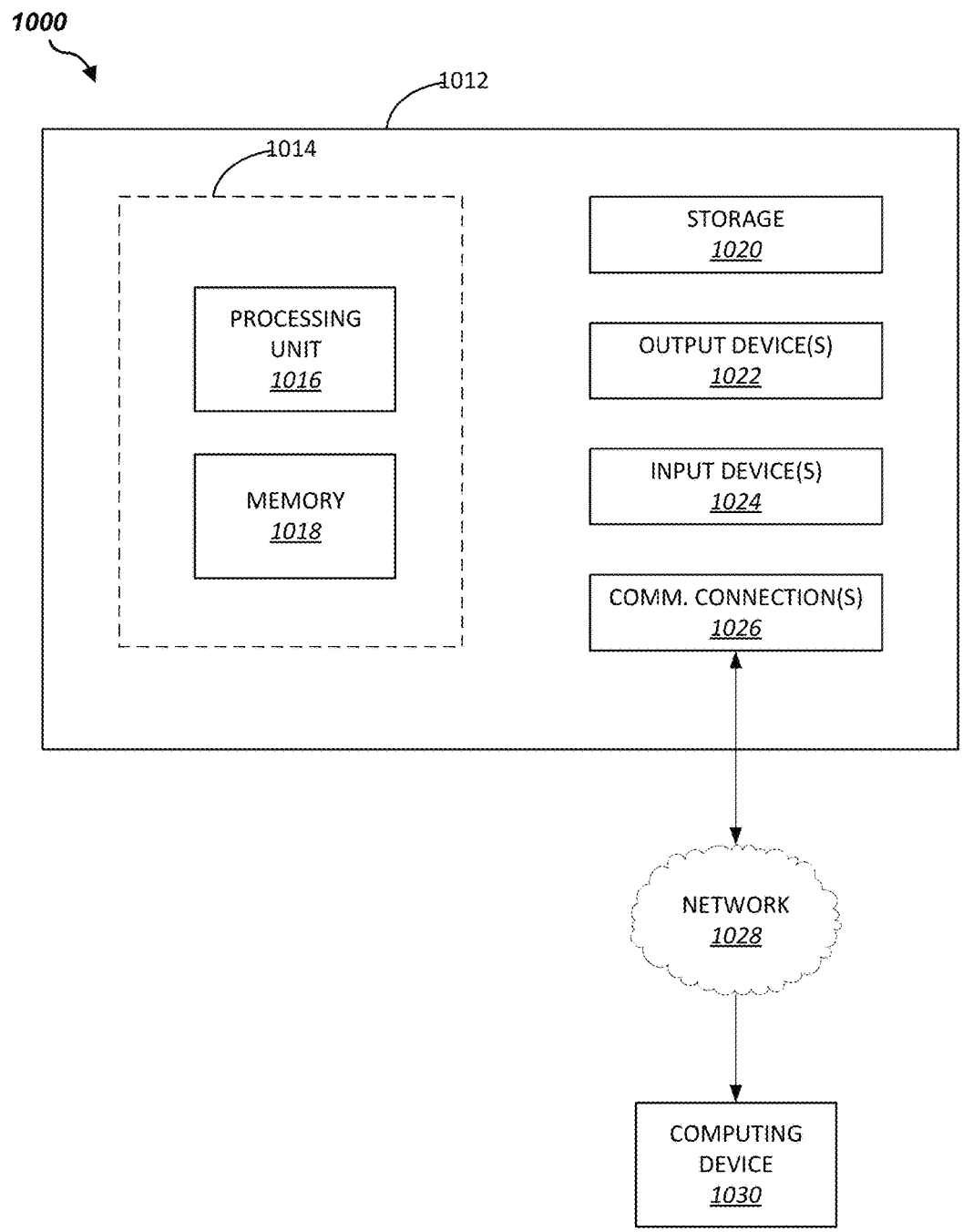
FIG. 10 is schematic of an example computing environment where one or more of the provisions set forth herein are implemented, according to one or more embodiments.

FIG. 10 and the following discussion provide a description of a suitable computing environment to implement embodiments of one or more of the provisions set forth herein. The operating environment of FIG. 10 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media objects, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 10 illustrates a system 1000 including a computing device 1012 configured to implement one or more embodiments provided herein. In one configuration, computing device 1012 includes at least one processing unit 1016 and memory 1018. Depending on the exact configuration and type of computing device, memory 1018 may be volatile, such as RAM, non-volatile, such as ROM, flash memory, etc., or a combination of the two. This configuration is illustrated in FIG. 10 by dashed line 1014.

In other embodiments, device 1012 includes additional features or functionality. For example, device 1012 may include additional storage such as removable storage or non-removable storage, including, but not limited to, magnetic storage, optical storage, etc. Such additional storage is illustrated in FIG. 10 by storage 1020. In one or more embodiments, computer readable instructions to implement one or more embodiments provided herein are in storage 1020. Storage 1020 may store other computer readable instructions to implement an operating system, an application program, etc. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 1012. Any such computer storage media is part of device 1012.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 1012 includes input device(s) 1024 such as keyboard, mouse, pen, voice input device, touch input device, infrared cameras, video input devices, or any other input device. Output device(s) 1022 such as one or more displays, speakers, printers, or any other output device may be included with device 1012. Input device(s) 1024 and output device(s) 1022 may be connected to device 1012 via a wired connection, wireless connection, or any combination thereof. In one or more embodiments, an input device or an output device from another computing device may be used as input device(s) 1024 or output device(s) 1022 for computing device 1012. Device 1012 may include communication connection(s) 1026 to facilitate communications with one or more other devices.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims. Thus, it will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method, comprising:
    receiving data representing an initial estimated arrival time for a vehicle;
    determining an initial time interval representing the total amount of time between the present time and the initial estimated arrival time;
    evenly dividing the initial time interval into a plurality of equal adjacent preset time intervals, the total duration of the preset time intervals equaling the initial time interval;
    displaying within the vehicle an animation including a plurality of objects, each of the objects representing one of the preset time intervals, wherein the animation further includes:
        representing the passage of time by the sequential movement of the plurality of objects such that movement of the last object in the sequence is determined to coincide with the initial estimated arrival time;
        in response to receiving a first estimated arrival time revision representing a first updated estimated arrival time, modifying the animation such that the movement of the last object in the sequence is determined to coincide with the first updated estimated arrival time; and
        determining not to modify the animation in response to receiving a second estimated arrival time revision representing a second updated estimated arrival time.

2. The method of claim 1,
    wherein modifying the animation in response to the first estimated arrival time revision is based on comparing the first revision to a predetermined threshold; and
    wherein determining not to modify the animation in response to receiving the second estimated arrival time revision is based on comparing the second revision to the threshold.

3. The method of claim 2, wherein the predetermined threshold is a change threshold, and wherein comparing each revision to the threshold comprises determining whether a time difference between the updated estimated arrival time and a previously received estimated arrival time exceeds the change threshold.

4. The method of claim 2, wherein the predetermined threshold is a remaining time threshold, and wherein comparing each revision to the threshold comprises determining whether the updated estimated arrival time exceeds the remaining time threshold.

5. The method of claim 1, wherein the estimated arrival times are received from a navigation system associated with the vehicle.

6. The method of claim 1, wherein modifying the animation comprises changing a total number of the plurality of objects included in the animation.

7. A vehicle entertainment system including a user display, the vehicle entertainment system further comprising a computer-readable medium having instructions to carry out the method of claim 1 to display the animation on the user display.

8. A computer-implemented method, comprising:
receiving data representing an initial estimated arrival time for a vehicle;
determining an initial time interval representing the total amount of time between the present time and the initial estimated arrival time;
evenly dividing the initial time interval into a plurality of equal adjacent preset time intervals, the total duration of the preset time intervals equaling the initial time interval;
displaying within the vehicle an animation including a plurality of objects, each of the objects representing one of the preset time intervals, wherein the animation further includes:
representing the passage of time by the sequential movement of the plurality of objects such that movement of the last object in the sequence is determined to coincide with the initial estimated arrival time;
in response to receiving an estimated arrival time revision representing an updated estimated arrival time, comparing the revision to a predetermined threshold; and
modifying the animation such that the movement of the last object in the sequence is determined to coincide with the updated estimated arrival time based on a result of comparing the revision to the threshold.

9. The method of claim 8, further comprising:
in response to receiving a second estimated arrival time revision representing a second updated estimated arrival time, comparing the second revision to the threshold; and
determining not to modify the animation based on a result of comparing the second revision to the threshold.

10. The method of claim 8, wherein the predetermined threshold is a change threshold, and wherein comparing the revision to the threshold comprises determining that the time difference between the updated estimated arrival time and a previously received estimated arrival time exceeds the change threshold.

11. The method of claim 8, wherein the predetermined threshold is a remaining time threshold, and wherein comparing the revision to the threshold comprises determining that the updated estimated arrival time exceeds the remaining time threshold.

12. A vehicle entertainment system including a user display, the vehicle entertainment system further comprising a computer-readable medium having instructions to carry out the method of claim 8 to display the animation on the user display.

13. A computer-implemented method, comprising:
receiving data representing an initial estimated arrival time for a vehicle;
determining an initial time interval representing the total amount of time between the present time and the initial estimated arrival time;
evenly dividing the initial time interval into a plurality of equal adjacent preset time intervals, the total duration of the preset time intervals equaling the initial time interval;
displaying within the vehicle an animation that includes a plurality of objects, each of the objects representing a different one of the equal adjacent present time intervals; including:
representing the passage of time by the sequential movement of the plurality of objects such that the conclusion of the animation includes the movement of the last object in the sequence and is determined to coincide with the initial estimated arrival time;
in response to receiving an estimated arrival time revision representing an updated estimated arrival time, comparing the revision to a predetermined threshold; and
modifying the animation such that the conclusion of the animation is determined to coincide with the updated estimated arrival time based on a result of comparing the revision to the threshold.

14. The method of claim 13, further comprising:
in response to receiving a second estimated arrival time revision representing a second updated estimated arrival time, comparing the second revision to the threshold; and
determining not to modify the animation based on a result of comparing the second revision to the threshold.

15. The method of claim 13, wherein the predetermined threshold is a change threshold, and wherein comparing the revision to the threshold comprises determining that the time difference between the updated estimated arrival time and a previously received estimated arrival time exceeds the change threshold.

16. The method of claim 13, wherein the predetermined threshold is a remaining time threshold, and wherein comparing the revision to the threshold comprises determining that the updated estimated arrival time exceeds the remaining time threshold.

17. The method of claim 13,
wherein the animation is modified such that the movement of the last object in the sequence is determined to coincide with the updated estimated arrival time.

18. The method of claim 17, wherein modifying the animation comprises changing a total number of the plurality of objects included in the animation.

19. The method of claim 13, wherein the estimated arrival times are received from a navigation system associated with the vehicle.

20. A vehicle entertainment system including a user display, the vehicle entertainment system further comprising a computer-readable medium having instructions to carry out the method of claim 13 to display the animation on the user display.

* * * * *